United States Patent
Ueda

(10) Patent No.: US 6,804,404 B2
(45) Date of Patent: Oct. 12, 2004

(54) SHAPE INFORMATION CODER AND DECODER DIVIDING SHAPE INFORMATION INTO LOWER-RESOLUTION SUBSETS

(75) Inventor: Yoshihiro Ueda, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 10/386,444

(22) Filed: Mar. 13, 2003

(65) Prior Publication Data

US 2003/0165275 A1 Sep. 4, 2003

Related U.S. Application Data

(62) Division of application No. 09/310,961, filed on May 13, 1999, now Pat. No. 6,633,681.

(30) Foreign Application Priority Data

Jun. 26, 1998 (JP) ............................................. 10-180627

(51) Int. Cl.[7] .............................. G06K 9/36; G06K 9/46
(52) U.S. Cl. ........................................ 382/240; 382/243
(58) Field of Search ................................. 382/232, 238, 382/243, 240, 298–299; 375/240.1, 240.11, 240.19, 240.21

(56) References Cited

U.S. PATENT DOCUMENTS

| | | | |
|---|---|---|---|
| 4,430,670 A | | 2/1984 | Netravali |
| 5,598,214 A | * | 1/1997 | Kondo et al. .......... 375/240.14 |
| 5,808,683 A | | 9/1998 | Tong et al. |
| 5,883,978 A | * | 3/1999 | Ono .......................... 382/248 |
| 5,973,745 A | | 10/1999 | Kondo |
| 6,014,463 A | | 1/2000 | Hirabayashi |

FOREIGN PATENT DOCUMENTS

JP  2610169  2/1997

OTHER PUBLICATIONS

U.S. patent application Ser. No. 09/112,199, filed Jul. 9, 1998, Zhixiong Wu, "Method and Apparatus for Image Encoding."

* cited by examiner

*Primary Examiner*—Timothy M. Johnson
(74) *Attorney, Agent, or Firm*—Venable LLP; Michael A. Sartori; W. Russell Swindell

(57) ABSTRACT

A shape information coder divides the pixels in the shape information into subsets representing different subsamplings of the shape information. Each pixel in each subset is coded with reference to a context which may be derived from reference pixels in more than one of the subsets. The context preferably includes reference pixels located on all sides of the pixel being coded, which leads to efficient coding. The shape information coder may have two or more cascaded stages, each operating as above, with one subset of pixels passed from each stage to be coded in the next stage. The resulting coded shape information is useful in, for example, wavelet coding of pictures.

9 Claims, 12 Drawing Sheets

SHAPE INFORMATION CODER AND DECODER DIVIDING SHAPE INFORMATION INTO LOWER-RESOLUTION SUBSETS

This is a divisional of U.S. application Ser. No. 09/310,961, filed May 13, 1999, now U.S. Pat. No. 6,633,681.

BACKGROUND OF THE INVENTION

The present invention relates to the coding of shape information, a process carried out in the coding and decoding of still and moving pictures.

When still or moving pictures are coded and decoded, a coding or decoding operation must sometimes be restricted to the picture elements in an irregular area. This occurs when hierarchical coding methods such as wavelet methods are employed. It then becomes necessary to furnish information specifying the shape of the area. The shape information can be represented in the form of a bi-level image, which must also be coded and decoded.

When a picture is coded hierarchically, it is convenient to code the accompanying shape information hierarchically as well. A known way to do this is to generate a series of bi-level images of decreasing resolution, and code the difference between each successive pair of images in the series by, for example, an entropy coding technique.

Typically, each bi-level image in the series has half the vertical and horizontal resolution of the preceding image. Thus each picture element or pixel in one image in the series derives from four pixels in the preceding image. In FIG. 1, for example, pixel A is derived from higher-resolution pixels a, b, c, d by a majority-decision rule. In some conventional coders, to improve the quality of the reduced image, the set of higher-resolution pixels is expanded to include more than four pixels.

A problem when shape information is coded in this way is that the wavelet transform and other hierarchical coding methods employ a decimating type of subsampling to reduce image resolution. To reduce the resolution by half, for example, they discard every second pixel in the horizontal and vertical directions. This subsampling method differs from the majority-decision methods employed in conventional hierarchical methods of coding shape information, leading to inconsistencies between the shape information and picture information. In wavelet coding, the result may be that the wavelet transform is applied to the wrong pixels, leading to image defects when the coded picture is decoded.

A further problem is that in the decoding process, each pixel can be decoded only with reference to pixels that have already been decoded. In conventional coding and decoding methods, the reference pixels are therefore disposed on only two sides of the pixel being coded or decoded. Use of this type of reference-pixel context does not lead to compression ratios as high as could be achieved if a more complete context were available. Some coders attempt to improve the context by increasing the number of reference pixels, but the resulting increase in the number of context states can actually lower the coding compression ratio.

SUMMARY OF THE INVENTION

It is accordingly an object of the present invention to obtain hierarchically coded and decoded shape information that is consistent with hierarchically coded and decoded picture information.

Another object of the invention is to improve the compression ratio of coded shape information.

The invented shape information coder has resolution converting means that processes input shape information by dividing the pixels in the shape information into mutually exclusive subsets, each subset representing a different sub-sampling of the input shape information and having a lower resolution than the input shape information. The subsets of pixels are stored in a memory means.

A context generating means selects reference pixels from the memory means and generates context information. Preferably, the context information generated for a pixel in one of the subsets is obtained from reference pixels selected from at least two of the subsets, including reference pixels disposed on all sides of the pixel. The context information may be simplified by assigning different combinations of reference-pixel values to the same context-information value. A coding means codes the subsets of pixels according to the context information.

The memory means may include a separate memory for each subset of pixels. The coding means and context generating means may include a separate coder for each memory, and a separate context generator for each coder, so that different subsets can be coded concurrently.

A hierarchical shape information coder according to the invention comprises a plurality of cascaded stages, each separately structured as described above. As input shape information, each stage (except the first) receives one of the subsets of pixels generated in the preceding stage. Context information may be supplied from each stage to the preceding stage, so that the subset of pixels received from the preceding stage does not have to be stored in the preceding stage.

The invention also provides a shape information decoder and a hierarchical shape information decoder analogous to the above shape information coder and hierarchical shape information coder, using similar context generating means.

The context generating means may comprise a reference pixel generator, a reference pixel position and context simplification memory, and a context converter.

BRIEF DESCRIPTION OF THE DRAWINGS

In the attached drawings:

FIG. 5 illustrates a variation of context generation in the first embodiment;

FIG. 7 illustrates context generation in the second embodiment;

DETAILED DESCRIPTION OF THE INVENTION

Figure 1:
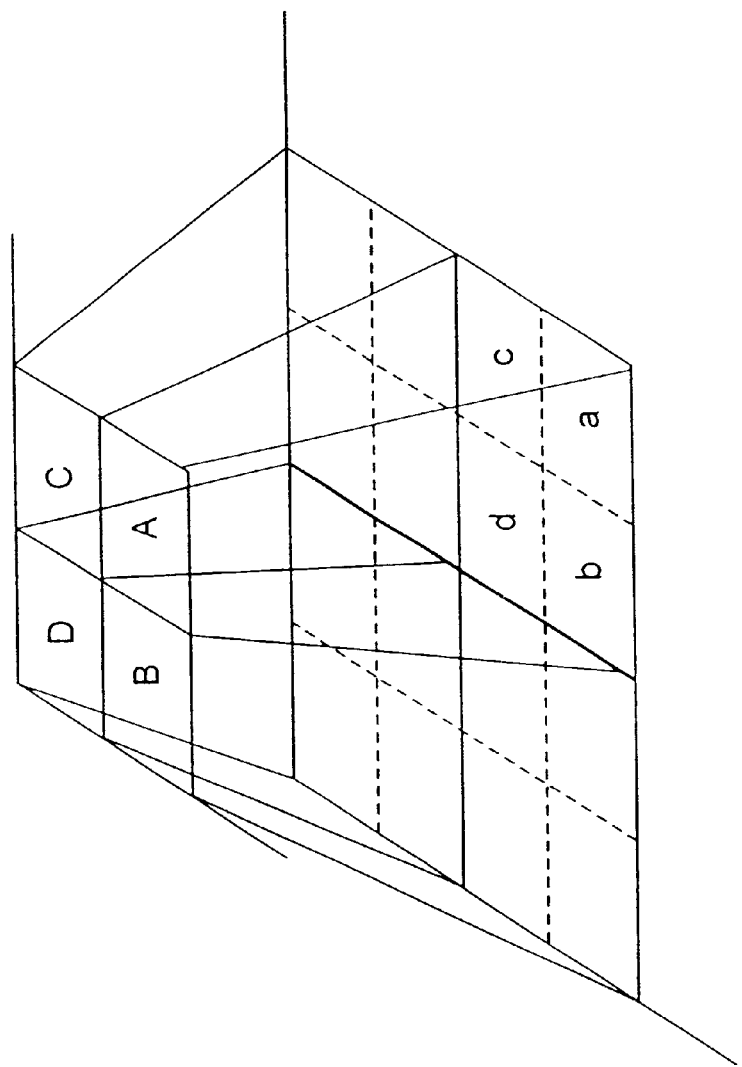
FIG. 1 illustrates a conventional hierarchical coding method.

Embodiments of the invention will be described with reference to the attached drawings, in which like parts are indicated by like reference characters.

Figure 2:
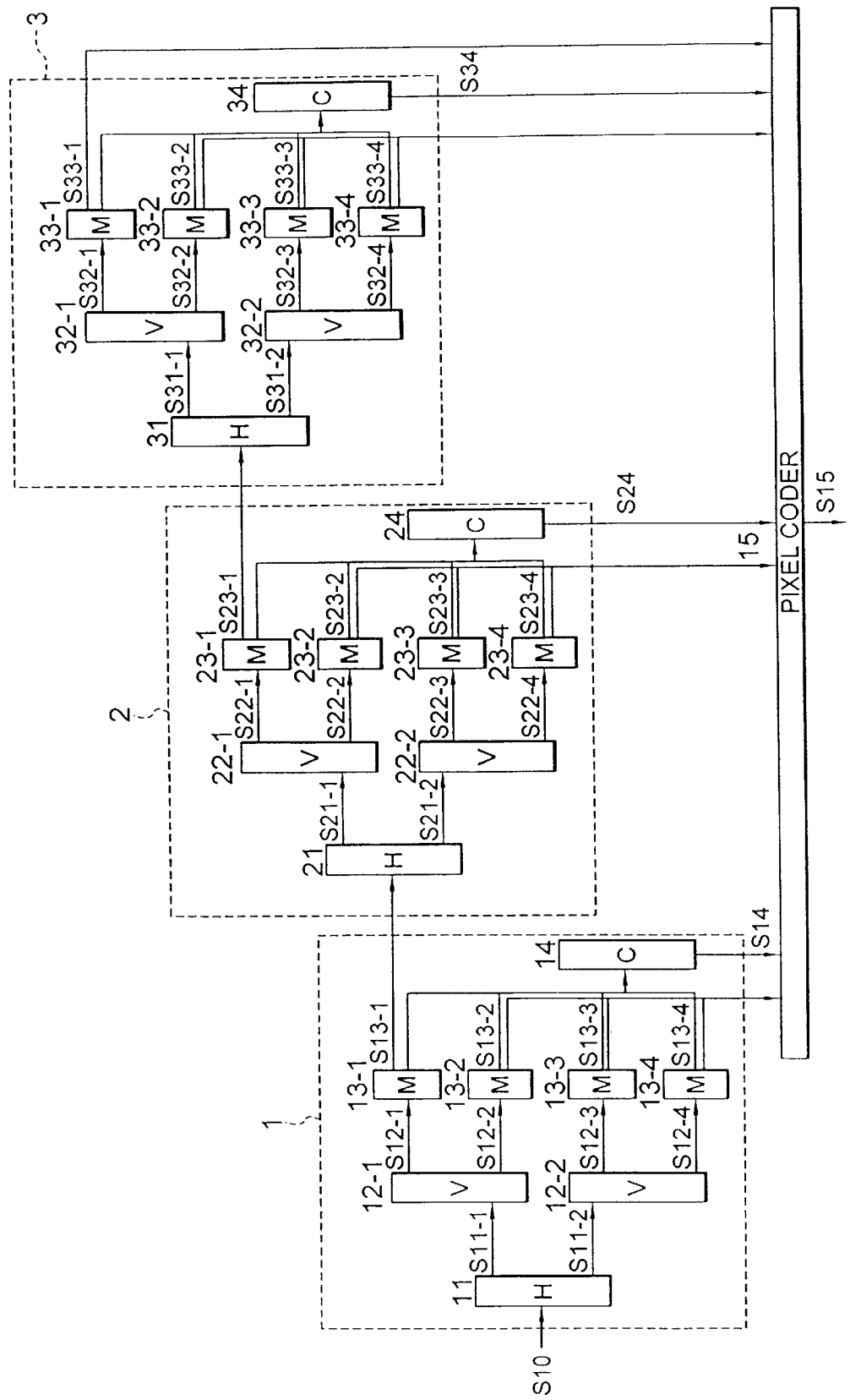
FIG. 2 is a block diagram of a shape information coder illustrating a first embodiment of the invention.

Referring to FIG. 2, the first embodiment is a shape information coder that receives shape information comprising a set of bi-level pixels S10 and outputs blocks of coded shape information S15. The coding process proceeds through three resolution-reduction stages, the first stage 1 generating subsets of comparatively high-resolution shape information, the second stage 2 generating subsets of medium-resolution shape information, and the third stage 3 generating subsets of low-resolution shape information. Each stage comprises a context generator (C), a plurality of resolution converters (H, V), and a plurality of memories (M). The subsets of shape information generated in these three stages are coded by a pixel coder.

The comparatively high-resolution shape information generated in the first stage has a resolution equal to half the resolution of the input shape information S10, horizontally and vertically. Each successive stage reduces the resolution by a further factor of two horizontally and vertically.

In the first stage 1, the input shape information S10 is subsampled by a horizontal resolution converter (H) 11 that outputs two different subsets of pixels S11-1 and S11-2 to respective vertical resolution converters (V) 12-1 and 12-2. The first vertical resolution converter 12-1 outputs two further subsets of pixels S12-1 and S12-2, writing subset S12-1 in a first memory (M) 13-1, and subset S12-2 in a second memory 13-2. The second vertical resolution converter 12-2 outputs a further subset of pixels S12-3 to a third memory 13-3, and a still further subset S12-4 to a fourth memory 13-4. These memories 13-1, 13-2, 13-3, 13-4 are read by a context generator (C) 14, the pixels read from memories 13-1, 13-2, 13-3, 13-4 being denoted S13-1, S13-2, S13-3, S13-4, respectively The pixel information S13-2, S13-3, S13-4 read from the second, third, and fourth memories is also supplied to the pixel coder 15, together with context information S14 from the context generator 14.

The second stage 2 is identical to the first stage 1, except that the input shape information is the first subset of pixel information S13-1 read from the first memory 13-1 in the first stage. The second stage 2 comprises resolution converters 21, 22-1, 22-2, memories 23-1, 23-2, 23-3, 23-4, and a context generator 24. The pixel coder 15 receives pixel information S23-2, S23-3, S23-4 from the second, third, and fourth memories 23-2, 23-3, 23-4, and context information S24 from the context generator 24.

The third stage 3 is identical to the first two stages, the input shape information now being the subset of pixel information S23-1 read from the first memory 23-1 in the second stage 2. The third stage 3 comprises resolution converters 31, 32-1, 32-2, memories 33-1, 33-2, 33-3, 33-4, and a context generator 34. The pixel coder 15 receives pixel information S33-1, S33-2, S33-3, S33-4 from all four memories in this stage, and context information S34 from the context generator 34.

The memories (M) comprise, for example, random access memory (RAM) circuits. The resolution converters (H, V) and context generators (C) comprise, for example, address counters that generate memory addresses and logic circuits that extract and sort pixel values. The pixel coder 15 comprises, for example, arithmetic, logic, and memory circuits specialized for an entropy coding process such as arithmetic coding. The resolution converters, context generators, and pixel coder may also be implemented by programs running on a suitable processor, such as a microprocessor or digital signal processor.

Next, the operation of the first embodiment will be described.

The horizontal resolution converter 11 sorts the pixels in the input shape information S10 according to their horizontal position. Subset S11-1 comprises pixels in even-numbered horizontal positions. Subset S11-2 comprises pixels in odd-numbered horizontal positions.

The first vertical resolution converter 12-1 subsamples subset S11-1 by sorting the pixels according to their vertical position, taking subset S12-1 from even vertical positions and subset S12-2 from odd vertical positions. Similarly, the second vertical resolution converter 12-2 takes subset S12-3 from even vertical positions and subset S12-4 from odd vertical positions in subset S11-2.

Figure 3:
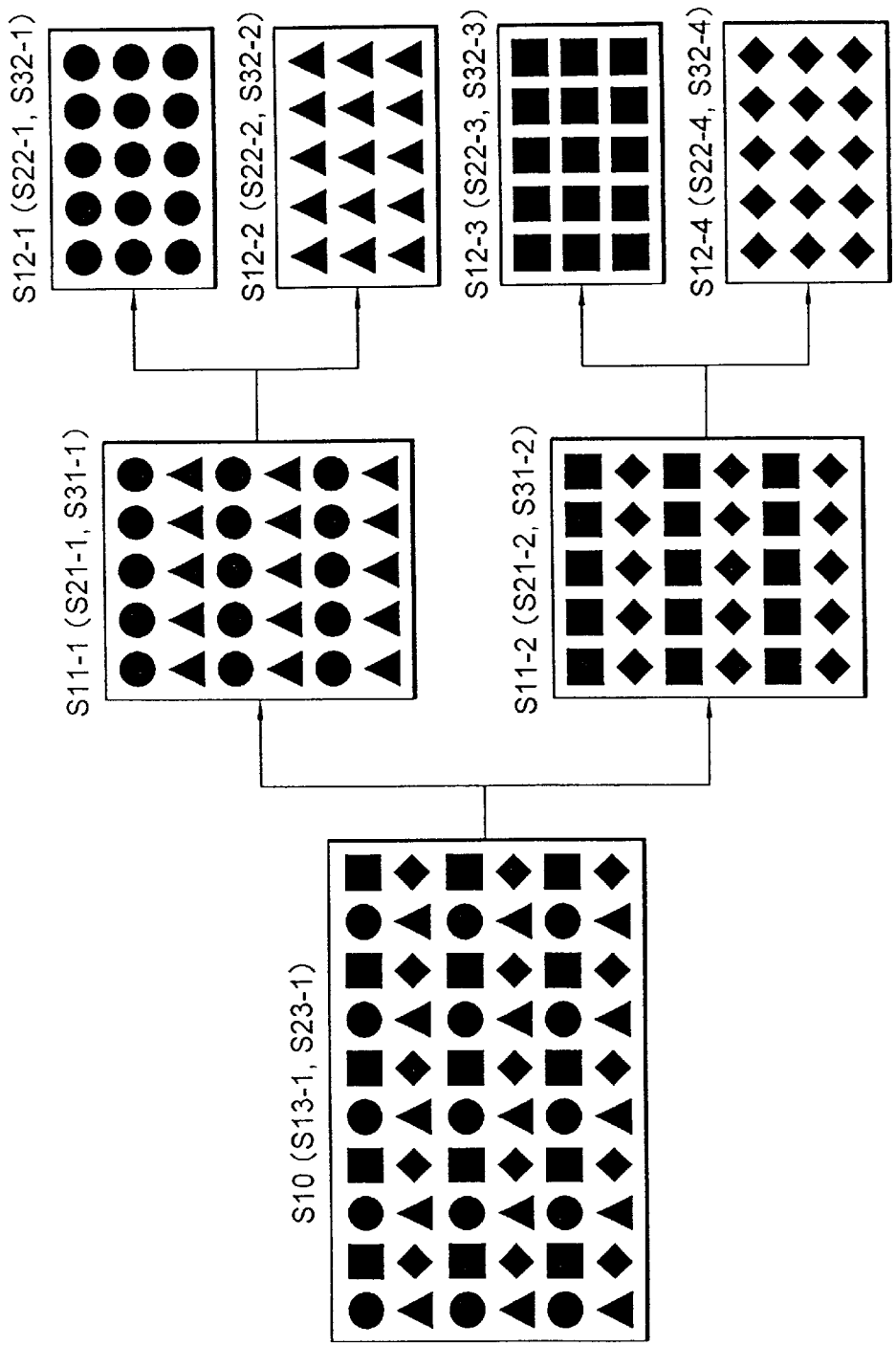
FIG. 3 illustrates resolution conversion in the first embodiment.

A similar subsampling of subset S13-1 is carried out in the second stage 2, and a similar subsampling of subset S23-1 is carried out in the third stage 3 FIG. 3 illustrates the subsampling operations by using circles, squares, triangles, and diamonds to denote pixels at even and odd horizontal and vertical positions. As illustrated in FIG. 3, the shape information received by each stage is divided into four mutually exclusive subsets of pixels.

When these subsampling operations have been completed, the pixel coder 15 begins coding the first low-resolution subset of pixels S33-1, read from memory 33-1. The pixel coder 15 scans each row of pixels in this subset S33-1 from left to right, taking the rows in order from top to bottom, and codes each pixel by an entropy coding method such as arithmetic coding, with reference to a context derived from four neighboring reference pixels that have already been coded. These reference pixels are indicated by circled numerals from one to four in column I in FIG. 4, in which the dark dot indicates the pixel being coded. The four reference pixels are obtained by context generator 34.

The efficiency of entropy coding depends on the extent to which the value of each pixel can be predicted from its context. In general, the value of the pixel being coded in column I in FIG. 4 is correlated sufficiently well with the values of the four reference pixels to enable a fairly high compression ratio to be achieved in the coding process.

Next, the pixel coder 15 codes the subset S33-2 of pixels read from the second memory 33-2 in the third stage 3. The pixels available for use as context information now include all of the pixels in memory 33-1, as well as pixels from memory 33-2 that have already been coded. The context generator 34 selects the five reference pixels indicated in column II in FIG. 4. In the pixel information S23-1 input to the third stage 3, the first two reference pixels (1 and 2), taken from memory 33-1, are the pixels immediately above and below the pixel being coded (the dark dot). The third reference pixel (3), taken from memory 33-2, is located two pixels to the left of the pixel being coded. The fourth and fifth reference pixels (4 and 5), taken from memory 33-1, are located two pixels to the right of the pixel being coded, in the rows above and below the row of the pixel being coded. The pixel coder 15 performs entropy coding using this five-pixel context. A very high compression ratio can be expected, because the context is derived from reference pixels on all four sides of the pixel being coded.

Figure 4:
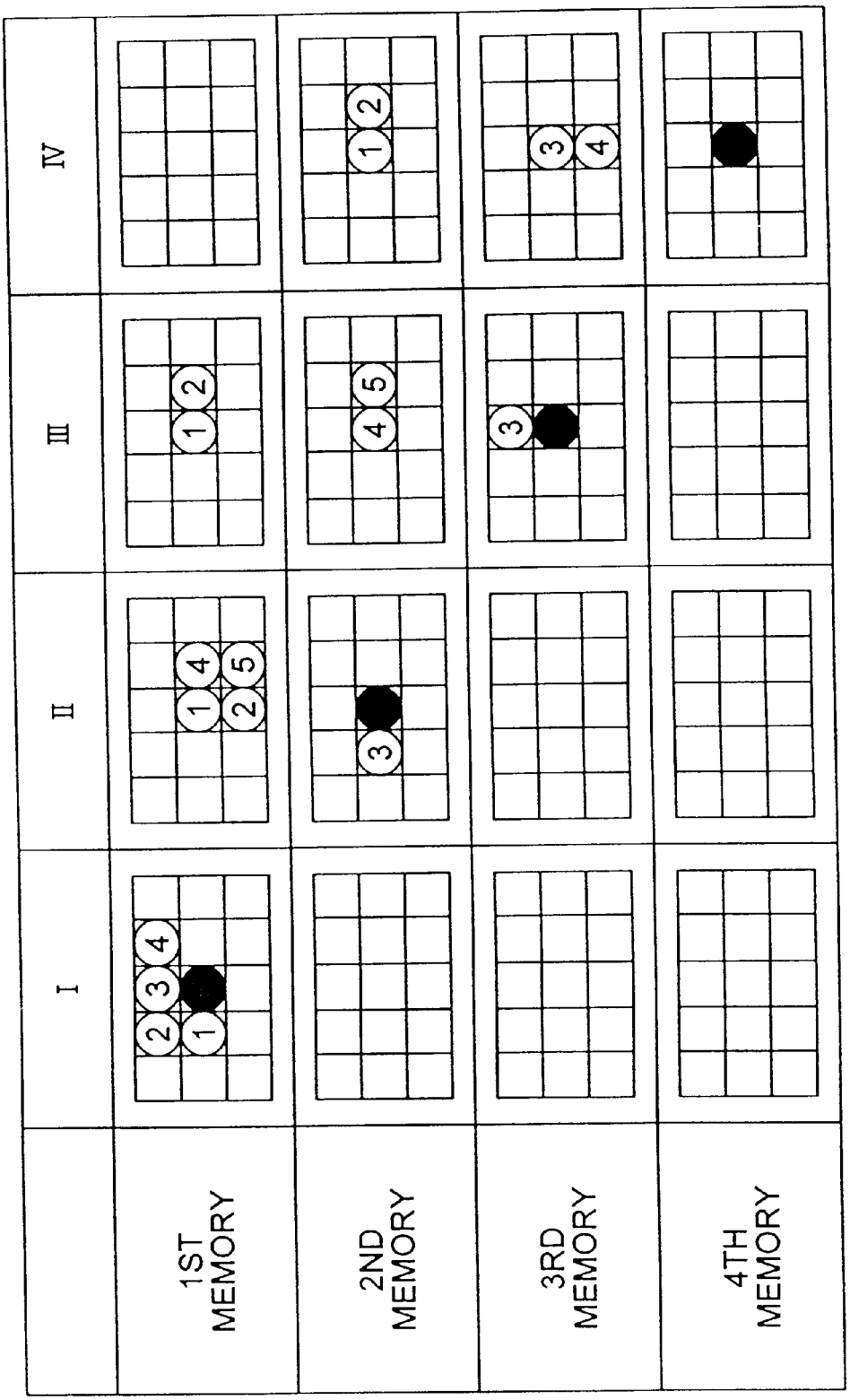
FIG. 4 illustrates context generation in the first embodiment.

Next, the pixel coder 15 codes the subset S33-3 of pixels read from the third memory 33-3 in the third stage 3, using entropy coding with the five-pixel context indicated in column III in FIG. 4. The first two reference pixels (1, 2), taken from memory 33-1, are directly adjacent the pixel being coded, being disposed immediately to its left and right in the information S23-1 input to the third stage 3. The third reference pixel (3), from memory 33-3, is located two pixels above the pixel being coded. The fourth and fifth reference pixels (4, 5), from memory 33-2, are diagonally adjacent the pixel being coded, to the lower left and lower right. A very high compression can again be expected.

Next, the pixel coder 15 codes the subset S33-4 of pixels read from the fourth memory 33-4 in the third stage 3, using entropy coding with the four-pixel context indicated in column IV in FIG. 4. In the input information S23-1, the first two reference pixels (1, 2), taken from memory 33-2, are located immediately to the left and right of the pixel being coded. The third and fourth reference pixels (3, 4) taken from memory 33-3 are located immediately above and below the pixel being coded. A very high compression ratio can again be expected, as the context includes all four immediately adjacent pixels.

The pixel coder 15 has now coded all pixels in the subset S23-1 read from the first memory 23-1 in the second stage 2, obtaining four blocks of coded low-resolution shape information. Next, the pixel coder 15 codes the subsets of pixels S23-2, S23-3, and S23-4 stored in the second, third, and fourth memories in the second stage 2 in the manner described above, using entropy coding with the contexts illustrated in columns II, III, and IV, respectively, in FIG. 4. The context information is furnished by context generator 24. This completes the coding of all pixels in the subset S13-1 read from the first memory 13-1 in the first stage, and adds three blocks of coded medium-resolution shape information to the coded output S15.

Finally, the pixel coder 15 codes the subsets of pixels S13-2, S13-3, and S13-4 stored in the second, third, and fourth memories in the first stage 1 in the same way, again using entropy coding with the contexts illustrated in columns II, III, and IV in FIG. 4, the context information being furnished by context generator 14. Adding three blocks of coded high-resolution shape information to the coded output S15, this process completes the coding of all pixels in the original shape information S10.

The first embodiment codes all of the original shape information S10 in an efficient hierarchical manner, using the same type of subsampling as employed in hierarchical picture coding methods such as wavelet methods. If the shape information is employed together with wavelet picture coding, to determine the pixels to which the wavelet transform is applied, then the coded shape information can be furnished to a wavelet decoder, enabling the decoder to obtain accurate shape information at each hierarchical stage of the wavelet decoding process. In this case, the first embodiment can be practiced as part of a wavelet picture coder, sharing the same memory means and resolution conversion means, requiring only the addition of the context generators 14, 24, 34 and pixel coder 15.

The first embodiment also provides a high compression ratio, because with the exception of the pixels in subset S33-1, the context of each pixel is derived from reference pixels disposed on all four sides of the pixel, taken from at least two subsets.

Figure 5:
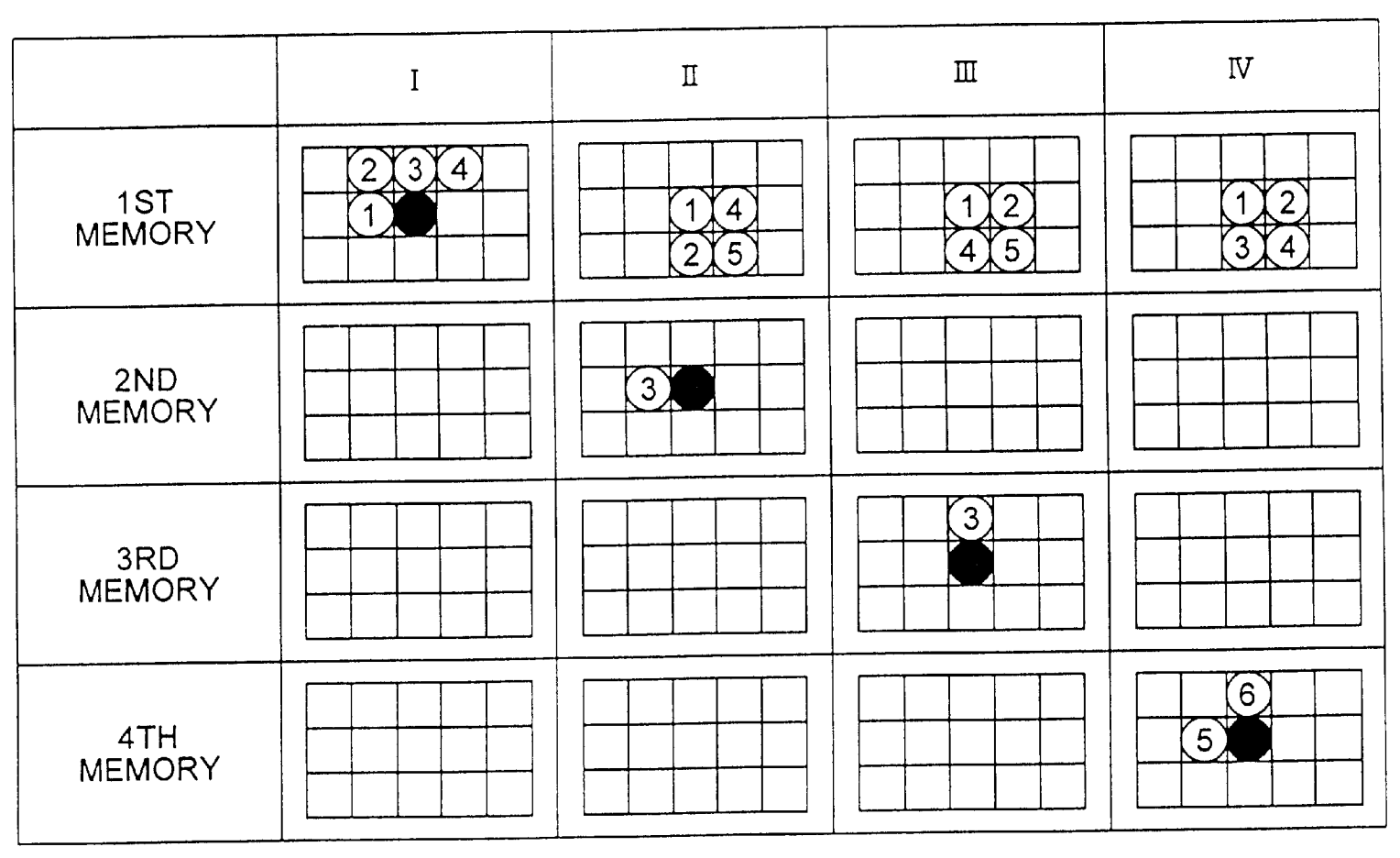

As a variation of the first embodiment, the context generators 14, 24, 34 can select contexts as shown in FIG. 5. Columns I and II, used in coding subsets S33-1, S33-2, S23-2, and S13-2, are identical to columns I and II in FIG. 4, with reference pixels read from the first and second memories in each stage. The five-pixel context in column III, used in the coding of subsets S13-3, S23-3, S33-3, includes reference pixels from the first and third memories in each stage. The six-pixel context in column IV, used in the coding of pixels read from the fourth memory in each stage, includes reference pixels from the first and fourth memories in each stage. The contexts in columns II, III, and IV again surround the pixel being coded on all four sides. This variation enables the subsets of pixels stored in the second, third, and fourth memories in each stage to be coded in any order, providing greater flexibility in adapting the shape information coding process to suit, for example, a wavelet picture coding process.

As another variation, the number of hierarchical stages can be increased or decreased. For example, there may be only one stage 1, in which case the first comparatively high-resolution subset S13-1 in FIG. 2 is supplied to the pixel coder 15. The shape information in this subset S13-1 can be used in one stage of a wavelet coding or decoding process. The input shape information S10, comprising subset S13-1 combined with the other three subsets S13-2, S13-3, S13-4, is used in a higher stage of the wavelet coding or decoding process. Thus the shape information is still coded in a hierarchical manner.

Figure 6:
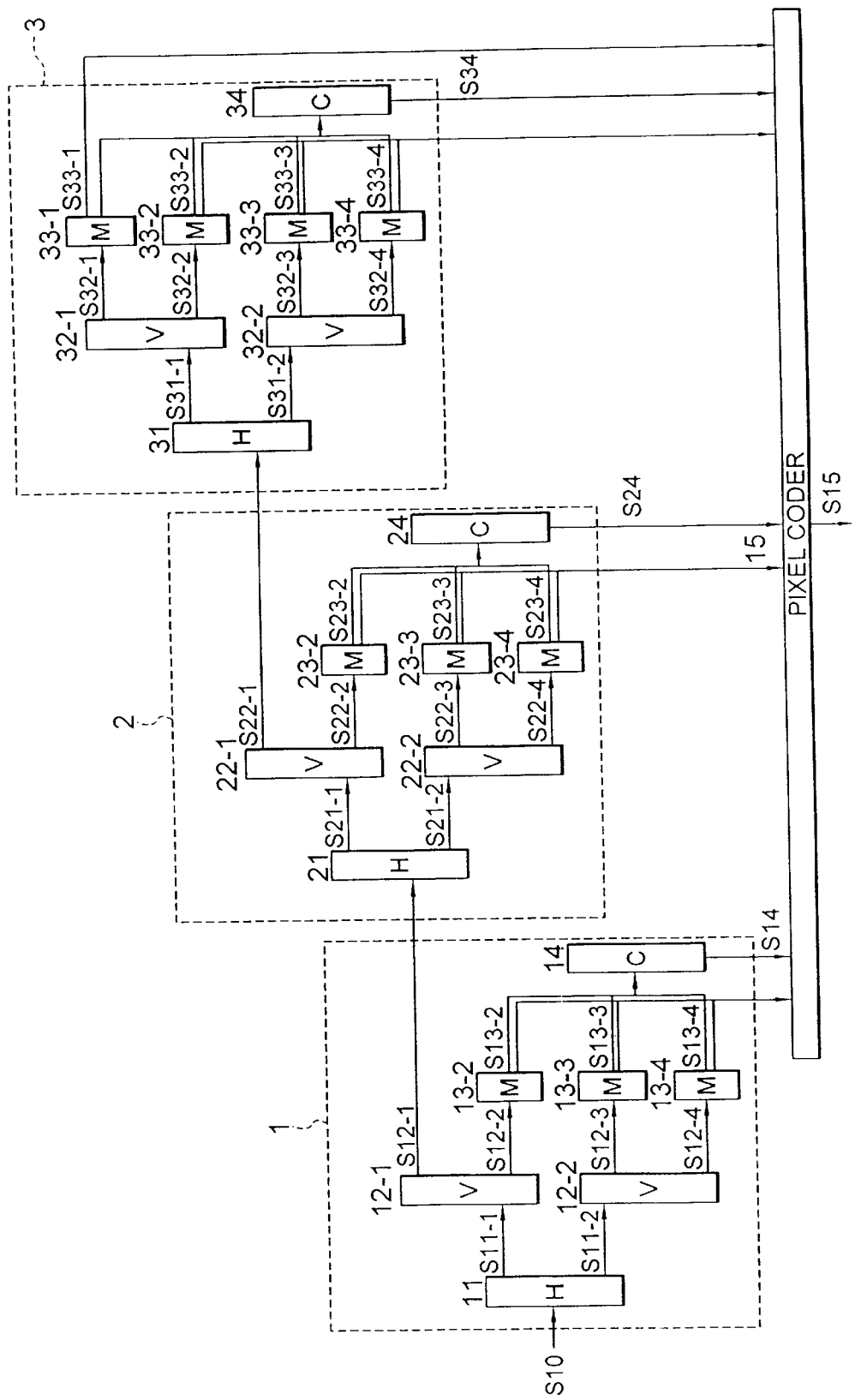
FIG. 6 is a block diagram of a shape information coder illustrating a second embodiment of the invention.

FIG. 6 illustrates a second embodiment of the invention. In the second embodiment, the subset of pixels S12-1 output by the first vertical resolution converter 12-1 in the first stage 1 is supplied directly to the horizontal resolution converter 21 in the second stage 2, without being stored in the first stage 1. Similarly, the subset of pixels S22-1 output by the first vertical resolution converter 22-1 in the second stage 2 is supplied directly to the horizontal resolution converter 31 in the third stage 3, without being stored in the second stage 2. Aside from these differences, the second embodiment has the same structure as the first embodiment.

The subsets of low-resolution information S33-1, S33-2, S33-3, and S33-4 produced in the third stage 3 are coded as in the first embodiment, using entropy coding with the contexts illustrated in columns I to IV in FIG. 4.

The subsets of medium-resolution information S23-2, S23-3, and S23-4 generated in the second stage 2 are also coded as in the first embodiment, except that since subset S22-1 has not been stored in the second stage 2, it cannot be read by context generator 24. Instead, the necessary reference pixels are obtained by the context generator 34 in the third stage 3, which reads them from memories 33-1, 33-2, 33-3, 33-4.

Figure 7:
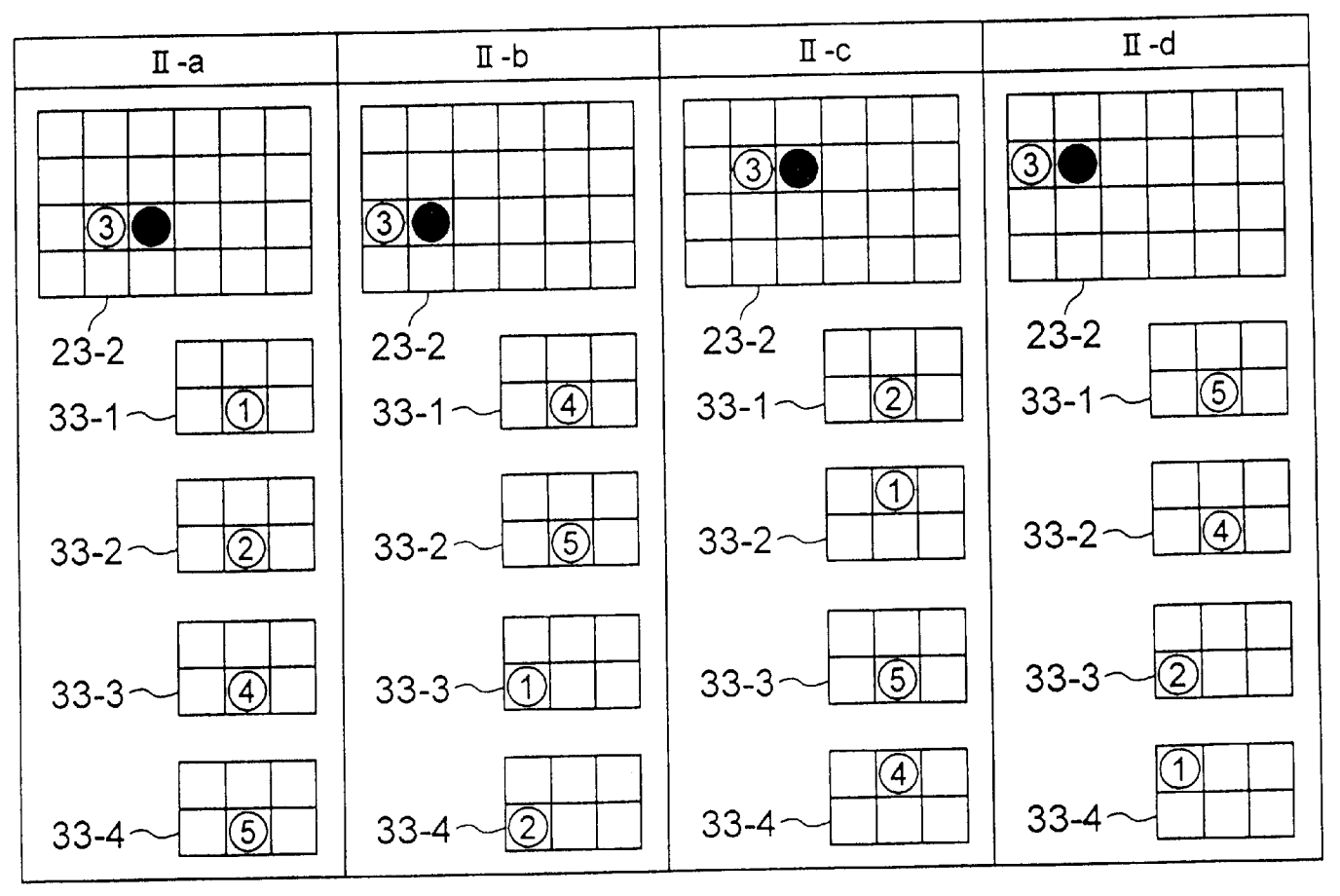

The storage locations of these reference pixels vary in relation to the position of the pixel being coded, depending on whether the pixel being coded is disposed in an even or odd horizontal position and an even or odd vertical position. FIG. 7 illustrates the various cases for the coding of pixels in subset S23-2, using the same numbering of reference pixels as in column II of FIG. 4. Column II-a illustrates the context of a pixel (dark dot) stored in even vertical and horizontal positions in memory 23-2. Context generator 24 reads one reference pixel (3) from memory 23-2 in the second stage 2; context generator 34 reads one reference pixel from each of the four memories 33-1, 33-2, 33-3, 33-4 in the third stage 3. Column II-b similarly illustrates the context of a pixel disposed in an even vertical and odd horizontal position. Column II-c illustrates the context of a pixel disposed in an odd vertical and even horizontal position. Column II-d illustrates the context of a pixel disposed in odd vertical and horizontal positions. In each case, the resulting context is the same as the context in the first embodiment, shown in column II in FIG. 4.

The high-resolution subsets of pixels S13-2, S13-3, and S13-4 are also coded in this way, the necessary reference pixels being obtained by all three context generators 14, 24, 34.

The second embodiment produces the same coded shape information as the first embodiment, but requires less memory. The same effects are obtained as in the first embodiment, and the same variations are possible.

Figure 8:
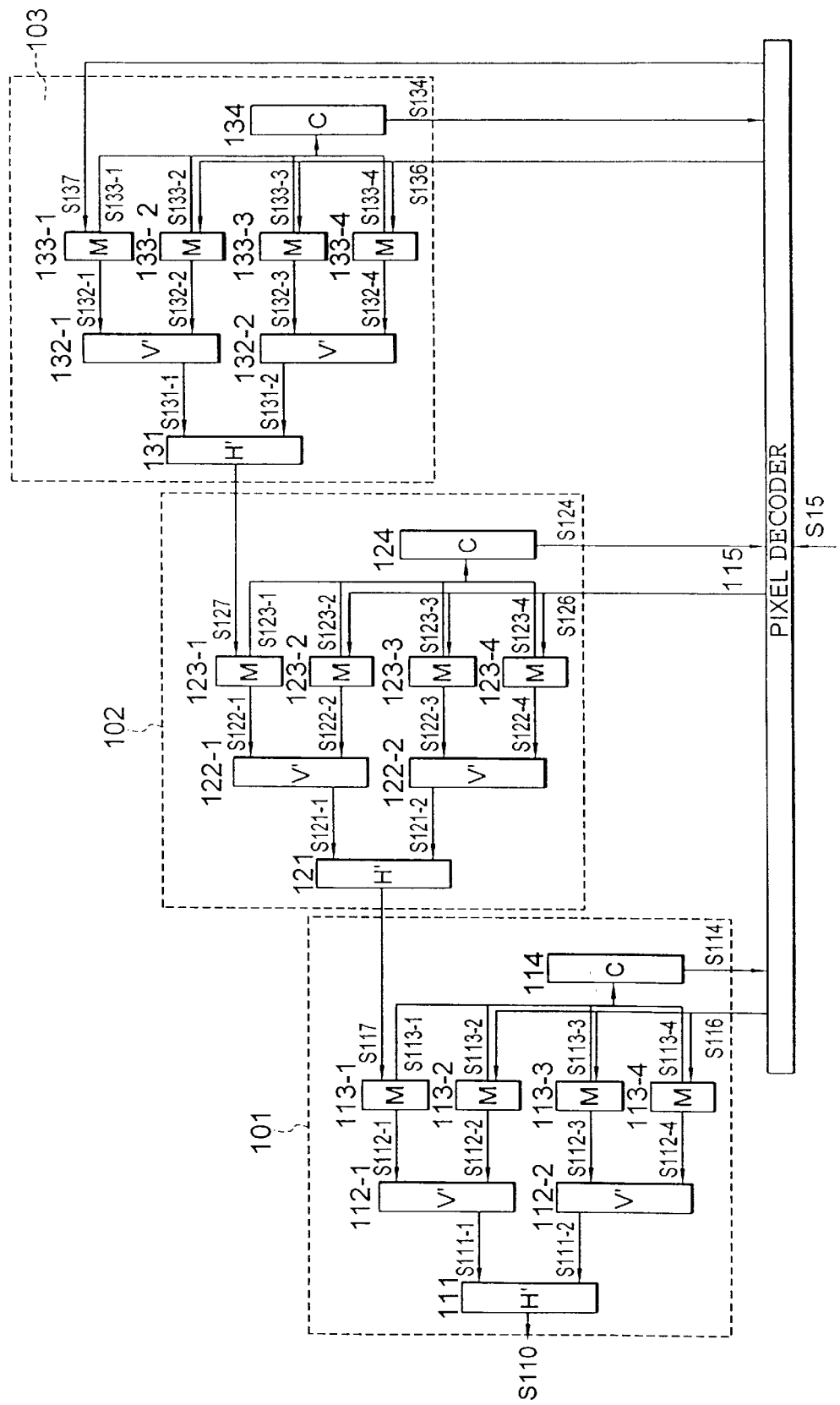
FIG. 8 is a block diagram of a shape information decoder illustrating a third embodiment of the invention.

As a third embodiment of the invention, FIG. 8 illustrates a shape information decoder for decoding the coded shape information generated by the first or second embodiment. The decoder comprises a plurality of memories (M), resolution deconverters (H', V'), and context generators (C) organized into three stages 101, 102, 103, and a pixel decoder 115 that receives coded shape information S15. The first or high-resolution stage 101 comprises a horizontal resolution deconverter (H') 111, which receives subsets of pixels S111-1 and S111-2 from a pair of vertical resolution deconverters (V') 112-1 and 112-2 and outputs decoded shape information S110. The first vertical resolution deconverter 112-1 reads a subset of pixels S112-1 from a first memory 113-1, and another subset of pixels S112-2 from a second memory 113-2. The second vertical resolution deconverter 112-1 reads a subset of pixels S112-3 from a third memory 113-3, and another subset of pixels S112-4 from a fourth memory 113-4. Resolution deconverters 111, 112-1, and 112-2 perform operations reverse to the subsampling operations carried out by the resolution converters 11, 12-1, 12-2 in the first embodiment. Context generator 114 supplies context information S114 obtained from memories 113-1, 113-2, 113-3, 113-4 to the pixel decoder 115, operating in the same way as context generator 14 in the first embodiment. When read by the context generator 114, the contents of memories 113-1, 113-2, 113-3, 113-4 are denoted S113-1, S113-2, S113-3, and S113-4, respectively. The pixel decoder 115 writes decoded pixels S116 in the second, third, and fourth memories S113-2, S113-3, S113-4.

The second stage 102 is structured similarly, comprising a horizontal resolution deconverter 121, a pair of vertical resolution deconverters 122-1 and 122-2, memories 123-1, 123-2, 123-3, 123-4, and a context generator 124. The horizontal resolution deconverter 121 outputs a comparatively high-resolution subset of pixels S117 to the first memory 113-1 in the first stage 101. The pixel decoder 115 writes decoded pixels S126 in the second, third, and fourth memories 123-2, 123-3, 123-4 in the second stage 102.

The third stage 103 is also similar, comprising a horizontal resolution deconverter 131, a pair of vertical resolution deconverters 132-1 and 132-2, memories 133-1, 133-2, 133-3, 133-4, and a context generator 134. The horizontal resolution deconverter 131 outputs a medium-resolution subset of pixels S127 to the first memory 123-1 in the second stage 102. The pixel decoder 115 writes decoded pixels S136 in the second, third, and fourth memories 133-2, 133-3, 133-4 in the third stage 103, and decoded pixels S137 in the first memory 133-1 in this stage 103.

Next, the operation of the third embodiment will be described. During this operation, the pixel values stored in each memory are the same as the pixel values stored in the corresponding memory in the first embodiment.

Upon receiving coded shape information S15, the pixel decoder 115 performs an entropy decoding process such as an arithmetic decoding process on the first block of coded low-resolution shape information to obtain decoded shape information S137, which is stored in the first memory 133-1 in the third stage. For the decoding of each pixel, the context generator 134 supplies a context derived from reference pixels S133-1 that have already been decoded and stored in memory 133-1. Next, the pixel decoder 115 decodes the second block of coded low-resolution shape information to obtain the pixels to be stored in the second memory 133-2. The context generator 134 supplies context information derived from reference pixels S133-1 and S133-2 read from memories 133-1 and 133-2. The third and fourth blocks of low-resolution shape information are similarly decoded and stored in the third and fourth memories 133-3, 133-4. The contexts used are the same as in the first embodiment, illustrated in FIG. 4. When decoding of the low-resolution shape information is completed, the resolution deconverters 132-1, 132-2, 131 reassemble the decoded pixels to obtain the medium-resolution subset of pixels S127, which is stored in the first memory 133-1 in the second stage 102.

The pixel decoder 115 now decodes three blocks of coded medium-resolution shape information S15, while context generator 124 supplies context information comprising reference pixels S123-1, S123-2, S123-3, S123-4 that have already been decoded. Resolution deconverters 122-1, 122-2, 121 reassemble the four medium-resolution subsets of decoded pixels S123-1, S123-2, S123-3, S123-4 to obtain the comparatively high-resolution subset of pixels S117, which is stored in memory 113-1 in the first stage 101.

Finally, three blocks of coded high-resolution shape information S15 are decoded and reassembled in the same way to obtain the decoded shape information S110.

The decoding process can proceed in parallel with a wavelet picture decoding process, the shape information obtained at each intermediate stage being used to place pixels produced by wavelet decoding in their correct positions. Specifically, the low-resolution shape information S137 decoded first is used in a first stage of the wavelet picture decoding process. The medium-resolution shape information S127 is used in a second stage of the wavelet picture decoding process. The comparatively high-resolution shape information S117 is used in a third stage of the wavelet picture decoding process. The final output shape information S110, which has the highest resolution, is used in a final stage of the wavelet picture decoding process. The resolution deconverters employ the same type of reverse subsampling as employed in wavelet decoding, permitting the sharing of resolution deconverting means between the wavelet decoder and shape information decoder, and at each stage of the picture decoding process, the wavelet decoder can obtain precisely the shape information it needs for correct picture decoding.

Figure 9:
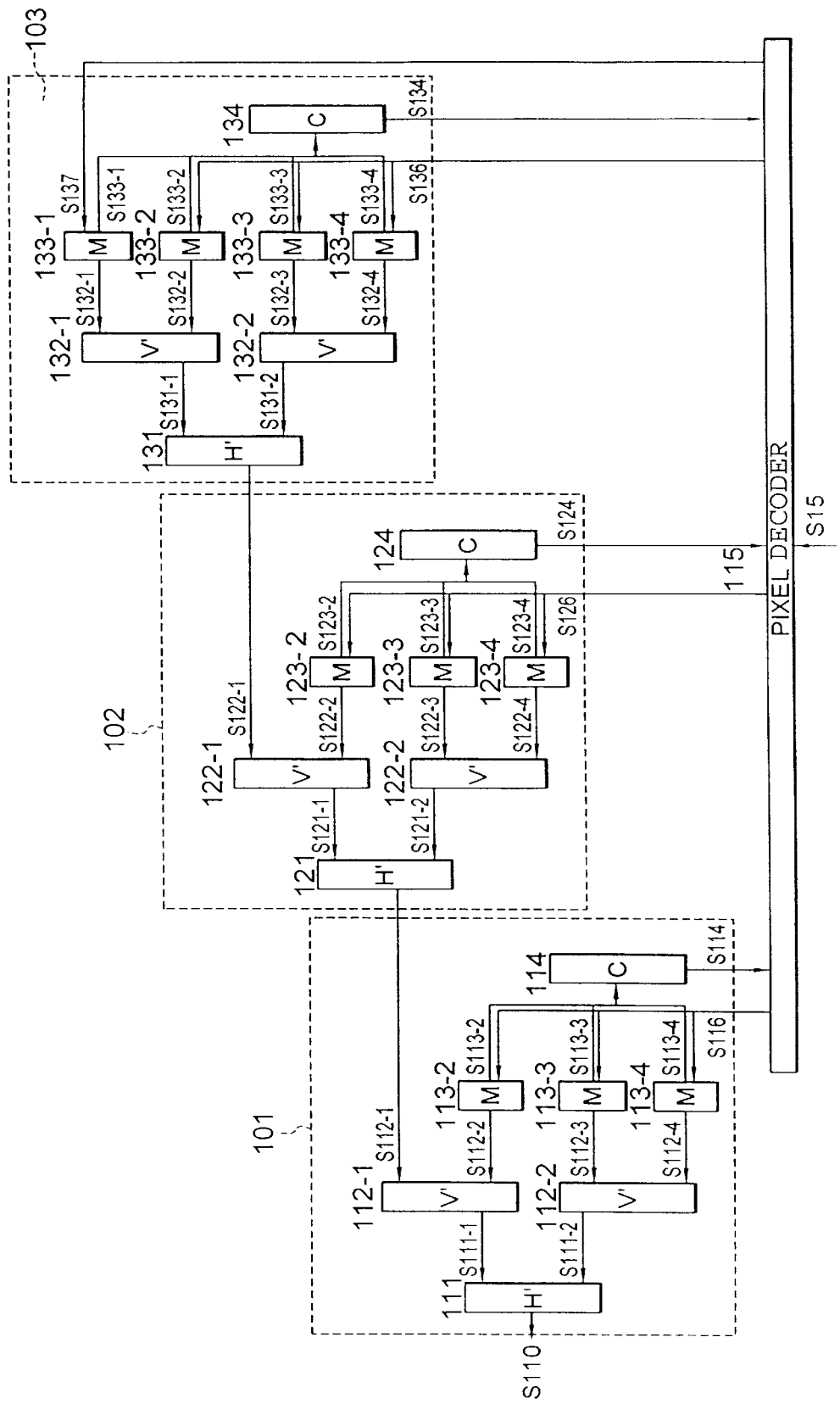
FIG. 9 is a block diagram of a shape information decoder illustrating a fourth embodiment.

As a fourth embodiment, FIG. 9 illustrates a decoder similar to the third embodiment, but lacking the first memories in the first and second stages 101, 102. The first vertical resolution deconverter 122-1 in the second stage 102 receives shape information S122-1 directly from the horizontal resolution deconverter 131 in the third stage 103. The first vertical resolution deconverter 112-1 in the first stage 101 receives shape information S112-1 directly from the horizontal resolution deconverter 121 in the second stage 102.

The fourth embodiment operates in the same way as the third embodiment, except that the context generators 114, 124, 134 function as in the second embodiment. Thus when decoding medium-resolution shape information S126, the pixel decoder 115 receives context information S124 and S134 from the context generators 124, 134 in both the second and third stages 102, 103. Similarly, when decoding high-resolution shape information S116, the pixel decoder 115 receives context information S114, S124, S134 from the context generators 114, 124, 134 in all three stages. The resolution deconverters in all stages operate after all pixels have been decoded and stored in the memories.

The fourth embodiment provides the same effects as the third embodiment, while using less memory.

Next, a fifth embodiment will be described. The fifth embodiment is a coder comprising cascaded stages with four memories in each stage, as in the first embodiment. In the fifth embodiment, a separate context generator and pixel coder are provided for each memory, and the coding of the contents of all memories proceeds in parallel.

Figure 10:
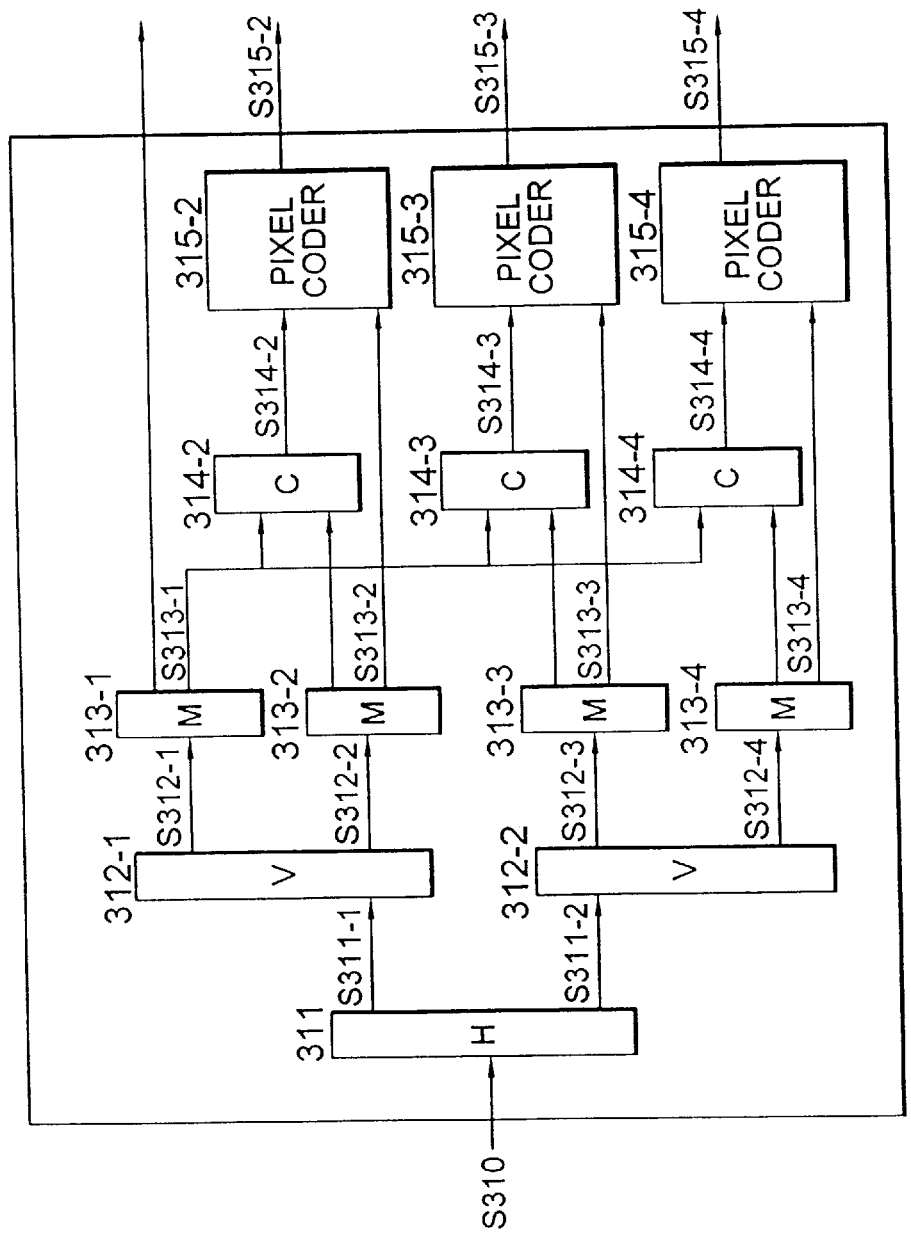
FIG. 10 is a block diagram of one stage in a shape information coder illustrating a fifth embodiment.

FIG. 10 shows the structure of a typical stage in the fifth embodiment. The input shape information S310 is the subset of pixels read from the first memory in the preceding stage, except in the first stage, in which the input shape information comprises all of the pixels input to the shape information coder. The horizontal resolution converter 311 and vertical resolution converters 312-1 and 312-2 operate as described in the first embodiment, storing subsampled subsets of pixels S312-1, S312-2, S312-3, S312-4 in memories 313-1, 313-2, 313-3, 313-4. The first of these subsets, read as pixels S313-1 from the first memory 313-1, is supplied to the next stage, and to three context generators 314-2, 314-3, 314-4. Pixels S313-2 read from the second memory 313-2 are supplied to context generator 314-2 and to a pixel coder 315-2. Pixels S313-3 read from the third memory 313-3 are supplied to context generator 314-3 and to another pixel coder 315-3. Pixels S313-4 read from the fourth memory 313-4 are supplied to context generator 314-4 and to another pixel coder 315-4. The three pixel coders 315-2, 315-3, 315-4 receive respective context information S314-2, S314-3, S314-4 from context generators 314-2, 314-3, 314-4. The contexts are as illustrated in columns II, III, and IV in FIG. 5.

In the lowest-resolution stage, an additional context generator and pixel coder are provided for the first memory. The context shown in column I in FIG. 5 is used by this additional context generator and pixel coder.

In the fifth embodiment, as soon as the vertical resolution converters S312-1, S312-2 have finished storing subsets of pixels in the four memories, and the contents of the first memory 313-1 have been transferred to the next stage, the context generators 314-2, 314-3, 314-4 and pixel coders 315-2, 315-3, 315-4 begin coding the contents of the second, third, and fourth memories 313-2, 313-3, 313-4, in parallel. The coding process is carried out as described in the first embodiment, using the contexts in FIG. 5 instead of the contexts in FIG. 4.

While this coding process proceeds, the pixels S313-1 transferred to the next stage are subsampled and stored in similar fashion, and coding in the next stage begins. Thus coding can proceed concurrently in different stages, as well as proceeding concurrently on different subsets of pixels in the same stage.

The fifth embodiment generates the same type of hierarchically coded shape information as in the first and second embodiments, but operates faster, because of the concurrent coding of the contents of different memories.

In a variation of the fifth embodiment, the same context generators and pixel coder are used in different stages. In this variation, coding in one stage cannot begin until coding in the previous stage has ended, but the entire coding process can still be speeded up by a factor of approximately three, as compared with the first embodiment.

Figure 11:
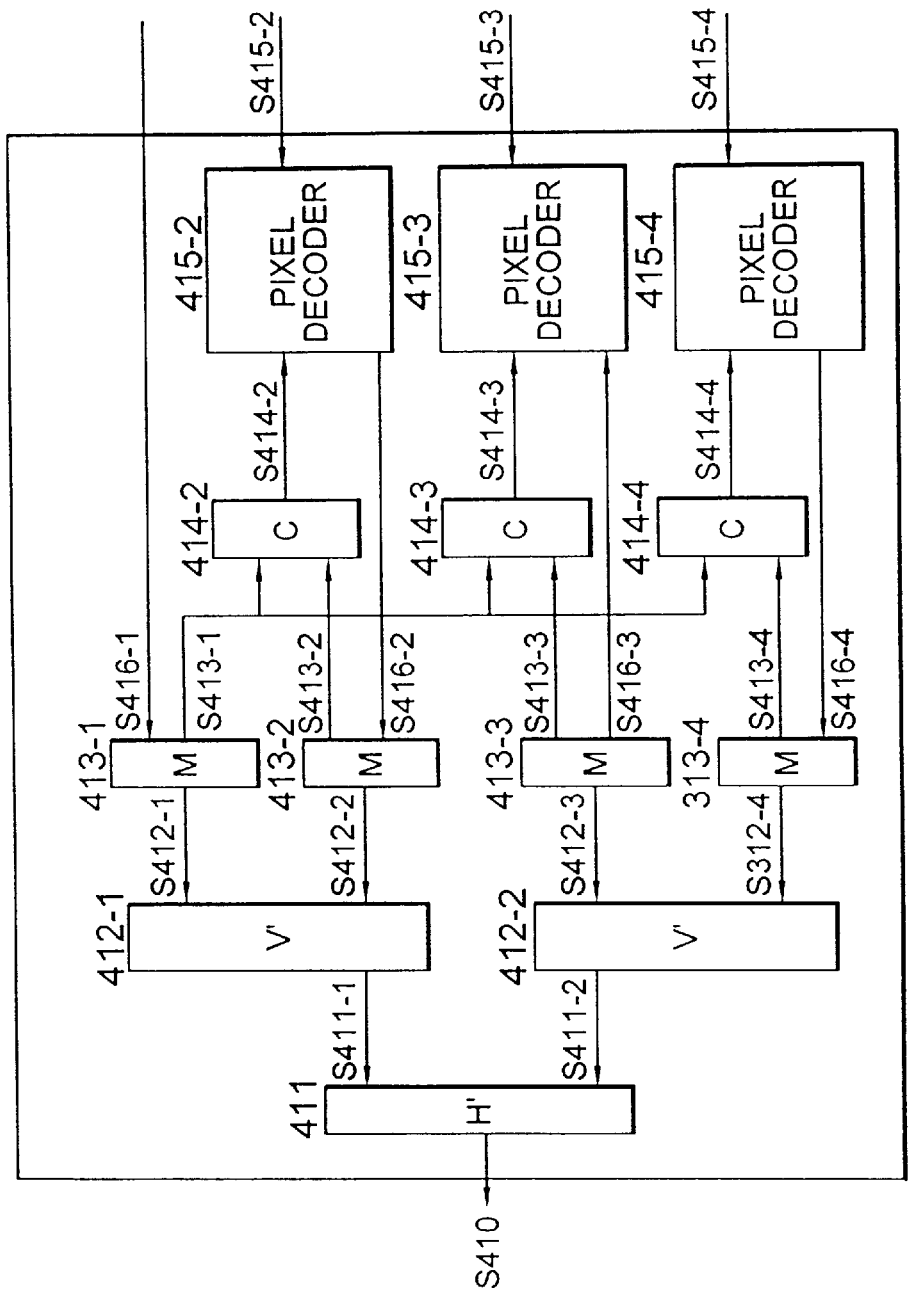
FIG. 11 is a block diagram of one stage in a shape information decoder illustrating a sixth embodiment.

As a sixth embodiment, FIG. 11 shows a typical stage in a decoder for decoding the coded shape information generated in the fifth embodiment. The typical stage comprises a horizontal resolution deconverter 411, vertical resolution deconverters 412-1 and 412-2, memories 413-1, 413-2, 413-3, 413-4, context generators 414-2, 414-3, 414-4, and pixel decoders 415-2, 415-3, 415-4.

Briefly, the sixth embodiment operates as follows. Pixels of shape information S416-1 from the next lower-resolution stage are stored in the first memory 413-1 and supplied (as reference pixels S413-1) to the context generators 414-2, 414-3, 414-4. The pixel decoders 415-2, 415-3, 415-4 receive coded shape information S415-2, S415-3, S415-4 from an external source, and context information S414-2, S414-3, S414-4 from the context generators, and generate decoded pixels S416-2, S416-3, S416-4, which are stored in the second, third and fourth memories 413-2, 413-3, 413-4. The contexts shown in FIG. 5 are used, so that the three pixel decoders 415-2, 415-3, 415-4 can operate concurrently. When the pixel decoders have finished decoding, the resolution deconverters 412-1, 412-2, 411 reassemble the decoded data to generate shape information of higher resolution, which is supplied to the next higher-resolution stage.

In the lowest-resolution stage, four context generators and four pixel decoders are provided. All four pixel decoders in this stage can operate concurrently if the second, third, and fourth pixel decoders lag one row behind the first pixel decoder.

The sixth embodiment provides the same effects as the third embodiment, but operates approximately three times as fast, because of the concurrent operation of the pixel decoders in each stage. A certain degree of concurrency between different coding stages is also possible, if higher-resolution stages lag slightly behind lower-resolution stages.

Figure 12:
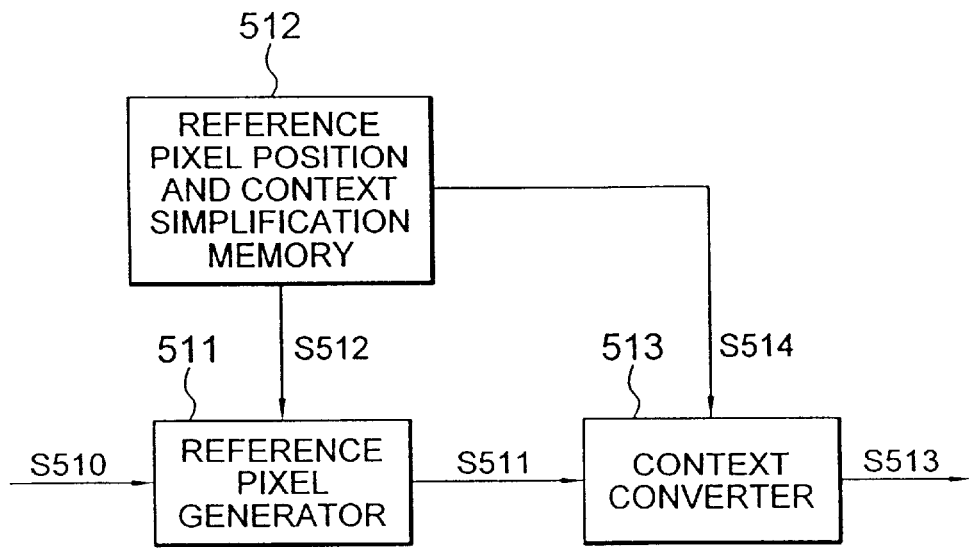
FIG. 12 is a block diagram illustrating the internal structure of a context generator according to the present invention.

As a seventh embodiment, FIG. 12 illustrates a context generator that can be applied in any of the preceding embodiments. This context generator differs from conventional context generators by reducing the number of context states, to simplify the entropy coding process.

This context generator comprises a reference pixel generator 511 that reads pixel information S510 from the appropriate memories shown in the preceding embodiments, and generates discrete context information S511 according to pixel position information S512 received from a reference pixel position and context simplification memory 512. A context converter 513 converts the discrete context information S511 to simplified context information S513 according to context conversion information S514 received from the reference pixel position and context simplification memory 512.

The operation of the seventh embodiment will be described below, taking the context shown in column II in FIG. 4 as an example. The reference pixel position and context simplification memory 512 stores information specifying the positions of the five reference pixels in this context, in relation to the pixel being coded or decoded. The pixel position information S512 instructs the reference pixel generator 511 to obtain the corresponding pixel values. The discrete context information S511 comprises a string of five bits giving the values of the reference pixels numbered one to five in column II in FIG. 4. This context has thirty-two ($2^5$) possible states, from '00000' to '11111'.

The context conversion information S514 instructs the context converter 513 to reduce these thirty-two possible states to ten states by, for example, the following rules. If the first two reference pixels (numbered 1 and 2 in FIG. 4) both have the value '1,' the simplified context information S513 has state nine. If these first two reference pixels both have the value '0,' the simplified context information S513 has state eight. If the first two reference pixels have different values, the simplified context information S513 has one of eight states from zero to seven, depending on the eight possible combinations of values of the third, fourth, and fifth reference pixels in the context.

As noted earlier, the first two reference pixels in this context are directly adjacent the pixel being coded, above and below it. If these two reference pixels have the same value, there is a high probability that the pixel to be coded also has the same value, regardless of the values of the other reference pixels. The ten-state context output by the context converter 513 is therefore almost as effective for entropy coding as the full thirty-two-state context.

Similar rules for simplifying the other contexts illustrated in FIG. 4, or FIG. 5, are stored in the reference pixel position and context simplification memory 512.

Figure 13:
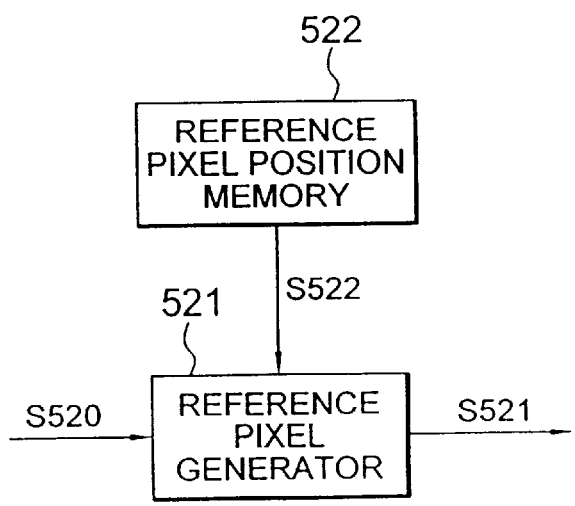
FIG. 13 is a block diagram illustrating the internal structure of a conventional context generator.

For comparison, FIG. 13 shows a conventional context generator comprising only a reference pixel generator 521 and a reference pixel position memory 522. This context generator outputs the full context, e.g., the context with thirty-two states in the example above. An entropy coder such as an arithmetic coder constructs a probability distribution by assigning probabilities to the occurrence of each value of the pixel to be coded for each context state. If the number of context states is large, the probability calculations become complex, especially if the entropy coder modifies the probability distributions adaptively during the coding process, as is often done. Furthermore, it is difficult to determine accurate probabilities for a large number of states, because each state occurs only infrequently. The resulting inaccurate probability assignments can lead to low compression ratios.

By discarding unimportant context information and thereby reducing the number of context states to which probabilities have to be assigned, the seventh embodiment simplifies and speeds up the entropy coding process. If the pixel coder modifies the probability distributions adaptively, the seventh embodiment can also improve the compression ratio, because each stage occurs more frequently, enabling more accurate probabilities to be assigned.

Those skilled in the art will recognize that further variations are possible within the scope claimed below.

What is claimed is:

1. A shape information coder for coding shape information represented by a set of pixels, the shape information relating to a particular image, the shape information coder comprising:

first resolution converting means dividing said set of pixels into a plurality of mutually exclusive first-resolution subsets, each first-resolution subset among said plurality of first-resolution subsets representing a different subsampling of said shape information and having a first resolution lower than a resolution of said shape information;

first memory means coupled to said first resolution converter, storing said first-resolution subsets;

first context generating means coupled to said first memory means, selecting reference pixels from said first memory means for each pixel in said first-resolution subsets, except in one of said first-resolution subsets, and generating context information for each said pixel from the reference pixels selected therefor;

second resolution converting means dividing said one of said plurality of first-resolution subsets into a plurality of mutually-exclusive second-resolution subsets, each second-resolution subset among said plurality of second-resolution subsets representing a different subsampling of said one of said plurality of first-resolution subsets and having a second resolution lower than said first resolution;

second memory means coupled to said second resolution converter, storing said second-resolution subsets;

second context generating means coupled to said second memory means, selecting reference pixels from said second memory means for each pixel in said second-resolution subsets, and generating context information for each said pixel from the reference pixels selected therefor; and coding means coupled to said context generating means, coding each said second-resolution subset and each said first-resolution subset other than said one of said plurality of first-resolution subsets according to the context information of the pixels in said first-resolution subset, and coding each said second-resolution subset according to the context information of the pixels in said second-resolution subset.

2. The shape information coder of claim 1, wherein for each pixel in one of said first-resolution subsets, said first context generating means selects reference pixels from at least two of said first-resolution subsets, and for each pixel in one of said second-resolution subsets, said second context generating means selects reference pixels from at least two of said second-resolution subsets.

3. The shape information coder of claim 2, wherein for each said pixel in said one of said second-resolution subsets, said second context generating means selects reference pixels that have already been coded and are disposed on all sides of said pixel, and for each said pixel in said first-resolution subsets, other than said one of said first-resolution subsets, said first context generating means selects reference pixels that are disposed on all sides of said pixel.

4. The shape information coder of claim 1, wherein said first and second context generating means, in generating said context information, assign at least two different combinations of values of said reference pixels to a single value of said context information.

5. The shape information coder of claim 1, wherein said first resolution converting means generates, as said first-resolution subsets, four subsets, each having a resolution reduced by a factor of two horizontally and vertically with respect to said shape information, and said second resolution converting means generates, as said second-resolution subsets, four subsets, each having a resolution reduced by a factor of two horizontally with respect to said one of said first-resolution subsets.

6. The shape information coder of claim 1, wherein said memory means comprises a plurality of memories each storing a different subset among said subsets.

7. The shape information coder of claim 6, wherein said coding means comprises a plurality of pixel coders concurrently coding the subsets stored in respective memories, and said context generating means comprises a plurality of context generators supplying context information to respective pixel coders.

8. A hierarchical shape information coder comprising a plurality of cascaded stages, from a highest-resolution stage to a lowest-resolution stage, each stage among said stages being separately structured as described in claim 1, each stage except said highest-resolution stage having a next-higher-resolution stage among said stages, the resolution converting means in each said stage except said highest-resolution stage receiving, as said shape information, one subset among the subsets generated by the resolution converting means in the next-higher-resolution stage.

9. The hierarchical shape information coder of claim 8, wherein the context generating means in each said stage expect said highest-resolution stage supplies context information to the coding means in the next-higher-resolution stage, and the shape information received by the resolution converting means in each said stage is not stored in the memory means in said next-higher-resolution stage.

* * * * *